United States Patent
Hagi

(10) Patent No.: US 12,071,211 B2
(45) Date of Patent: Aug. 27, 2024

(54) OUTBOARD MOTOR SUSPENSION STRUCTURE AND OUTBOARD MOTOR

(71) Applicant: YAMAHA HATSUDOKI KABUSHIKI KAISHA, Iwata (JP)

(72) Inventor: Tomohiro Hagi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/896,121

(22) Filed: Aug. 26, 2022

(65) Prior Publication Data

US 2023/0145629 A1    May 11, 2023

(30) Foreign Application Priority Data

Nov. 11, 2021 (JP) ................................. 2021-184081

(51) Int. Cl.
*B63H 20/06* (2006.01)
*B63H 20/10* (2006.01)
*F16M 13/02* (2006.01)

(52) U.S. Cl.
CPC ............. *B63H 20/06* (2013.01); *B63H 20/10* (2013.01); *F16M 13/022* (2013.01)

(58) Field of Classification Search
CPC ....... B63H 20/06; B63H 20/10; F16M 13/022
USPC ................................................ 248/640, 642
See application file for complete search history.

(56) References Cited

U.S. PATENT DOCUMENTS

| | | | |
|---|---|---|---|
| 4,354,848 A * | 10/1982 | Hall ...................... | B63H 20/06 248/642 |
| 6,645,019 B1 | 11/2003 | Shiomi et al. | |
| 8,882,551 B1 * | 11/2014 | Quail .................... | B63H 20/06 440/53 |
| 8,967,314 B2 * | 3/2015 | Murayama ............ | B62K 11/04 180/292 |
| 9,701,383 B1 * | 7/2017 | Stuber ................... | B63H 20/06 |
| 9,776,699 B1 * | 10/2017 | Alby ..................... | B63H 20/12 |
| 9,963,213 B1 * | 5/2018 | Jaszewski ............ | B63H 20/06 |
| 9,969,475 B1 * | 5/2018 | Waisanen ............. | B63H 20/06 |
| 10,220,925 B1 * | 3/2019 | Pelini ................... | B63H 20/06 |
| 10,220,926 B1 * | 3/2019 | Pelini ................... | B63H 5/125 |
| 10,259,554 B1 * | 4/2019 | Eichinger ............. | B63H 20/14 |

(Continued)

FOREIGN PATENT DOCUMENTS

| | | |
|---|---|---|
| JP | 57-41292 A | 3/1982 |
| JP | 57-209491 A | 12/1982 |

(Continued)

*Primary Examiner* — Muhammad Ijaz
(74) *Attorney, Agent, or Firm* — Keating & Bennett, LLP

(57) ABSTRACT

A suspension structure includes a clamp bracket attachable to a hull, a main load bearing portion to support an outboard motor body to mainly bear the weight of the outboard motor body, a tilt shaft, a coupling, and a cylinder to change a trim angle or a tilt angle of the outboard motor body. The coupling includes a first end rotatably supported by the tilt shaft, and a second end fixed to the main load bearing portion. The cylinder includes a first end supported by the clamp bracket at a position lower than the tilt shaft and rotatable about a first rotation shaft in an up-down direction, and a second end supporting the coupling and rotatable about a second rotation shaft in the up-down direction. The second rotation shaft is provided in or near the main load bearing portion.

12 Claims, 7 Drawing Sheets

(56) References Cited

U.S. PATENT DOCUMENTS

| | | | |
|---|---|---|---|
| 10,988,222 B1* | 4/2021 | Langenfeld | B63H 20/28 |
| 11,433,980 B1* | 9/2022 | Zarembka | B63H 20/02 |
| 11,448,121 B2* | 9/2022 | Nakayama | F02B 61/045 |
| 2011/0104964 A1* | 5/2011 | Hagi | B63H 20/02 |
| | | | 440/53 |
| 2012/0094557 A1* | 4/2012 | Takase | B63H 20/12 |
| | | | 440/53 |
| 2012/0094558 A1* | 4/2012 | Takase | B63H 20/12 |
| | | | 440/58 |
| 2019/0185124 A1 | 6/2019 | Tokuda | |
| 2019/0344871 A1* | 11/2019 | Takase | B63H 20/06 |
| 2020/0130797 A1* | 4/2020 | Mizutani | B63H 20/06 |
| 2020/0156751 A1* | 5/2020 | Skrzypchak | B63H 20/12 |
| 2021/0061431 A1* | 3/2021 | Mcginley | B63H 20/12 |
| 2021/0129964 A1* | 5/2021 | Miyashita | B63H 20/06 |
| 2022/0266969 A1* | 8/2022 | Poirier | B63H 20/007 |
| 2022/0332400 A1* | 10/2022 | Matsunaga | B63H 25/12 |
| 2023/0144964 A1* | 5/2023 | Hagi | B63H 20/10 |
| | | | 248/642 |
| 2023/0145629 A1* | 5/2023 | Hagi | B63H 20/10 |
| | | | 248/642 |

FOREIGN PATENT DOCUMENTS

| | | |
|---|---|---|
| JP | 07-10083 A | 1/1995 |
| JP | 2001-001988 A | 1/2001 |
| JP | 2005-329829 A | 12/2005 |
| JP | 4093520 B2 | 6/2008 |
| JP | 2008-162331 A | 7/2008 |
| JP | 2019-107995 A | 7/2019 |

\* cited by examiner

OUTBOARD MOTOR SUSPENSION STRUCTURE AND OUTBOARD MOTOR

CROSS REFERENCE TO RELATED APPLICATIONS

This application claims the benefit of priority to Japanese Patent Application No. 2021-184081 filed on Nov. 11, 2021. The entire contents of this application are hereby incorporated herein by reference.

BACKGROUND OF THE INVENTION

1. Field of the Invention

The present invention relates to suspension structures for outboard motors, and outboard motors.

2. Description of the Related Art

As disclosed in Japanese Laid-open Patent Publication (Kokai) No. 2019-107995, suspension structures for suspending or hanging an outboard motor body onto a hull are known. A typical suspension structure includes a clamp bracket to be fixed to a hull, a tilt shaft attached to the clamp bracket, and a swivel bracket pivotally attached to the clamp bracket via the tilt shaft. An outboard motor body is fixed to the swivel bracket. With such a structure, the fixed outboard motor body is pivotable around the tilt shaft, and its inclination angle relative to the clamp bracket (relative to the hull) is changeable.

In order to tilt up/tilt down the outboard motor body, cylinders are provided between the clamp bracket and the swivel bracket. The cylinders typically include a trim cylinder for changing the inclination angle of the outboard motor body for trim adjustment purposes, and a tilt cylinder for tilting up the outboard motor body to a retracted position above the water surface or tilting down the outboard motor body into water.

During navigation, such a suspension structure bears a forward thrust force originated from the thrust of the outboard motor. In particular, when a hull leaves the water surface and then lands on the water during navigation, increased weight (G) of the outboard motor acts on a suspension structure. Due to the thrust force and the own weight of the outboard motor, a bending stress mainly occurs in the swivel bracket.

On the other hand, the weight of outboard motors is increasing as outboard motors become larger. Furthermore, there is a tendency to provide an increased backward thrust in recent outboard motors, and a bending moment caused by the weight of such an outboard motor is further increased. In this situation, the strength of the swivel bracket or other members in the suspension structure may increase by simply increasing the strength of the members of the suspension structure. However, the increase of the strength of the members results in an increase of the total weight of the suspension structure, and there is room for improvement.

SUMMARY OF THE INVENTION

Preferred embodiments of the present invention provide suspension structures for outboard motors and outboard motors, in each of which the strength is enhanced while significantly reducing or preventing an increase in the weight.

According to a preferred embodiment of the present invention, a suspension structure for an outboard motor includes a clamp bracket attachable to a hull, and a main load bearing portion to support an outboard motor body and mainly bear a weight of the outboard motor body. The suspension structure further includes a tilt shaft, a coupling, and a cylinder to change a trim angle or a tilt angle of the outboard motor body. The coupling includes a first end supported by the tilt shaft and rotatable about the tilt shaft, and a second end fixed to the main load bearing portion. The cylinder includes a first end supported by the clamp bracket at a position lower than the tilt shaft and rotatable about a first rotation shaft in an up-down direction relative to the clamp bracket, and a second end supporting the coupling and rotatable about a second rotation shaft in the up-down direction. The second rotation shaft is provided in the main load bearing portion or located near the main load bearing portion.

According to another preferred embodiment of the present invention, a suspension structure for an outboard motor includes a clamp bracket attachable to a hull, a swivel bracket to be fixed to an outboard motor body, a tilt shaft, and a cylinder to change a trim angle or a tilt angle of the outboard motor body. The cylinder has a first end supported by the clamp bracket at a position lower than the tilt shaft and rotatable about a first rotation shaft in an up-down direction relative to the clamp bracket, and a second end supporting the swivel bracket and rotatable about a second rotation shaft in the up-down direction. When the outboard motor body is in a tilted-down position, the second rotation shaft is located at a position lower than the first rotation shaft.

According to another preferred embodiment of the present invention, an outboard motor includes an outboard motor body, and any of the above-described suspension structures.

According to the above configurations, when an outboard motor body is, for example, in a tilted-down position, the weight of the outboard motor body causes a tensile force acting between the tilt shaft and the second rotation shaft on the coupling, and a compressive force acting between the first rotation shaft and the second rotation shaft on the cylinder. Therefore, it is less necessary to increase the strength of the coupling in order to cope with the bending stress. Therefore, it is possible to increase the strength of the suspension structure while significantly reducing or preventing an increase in its weight.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
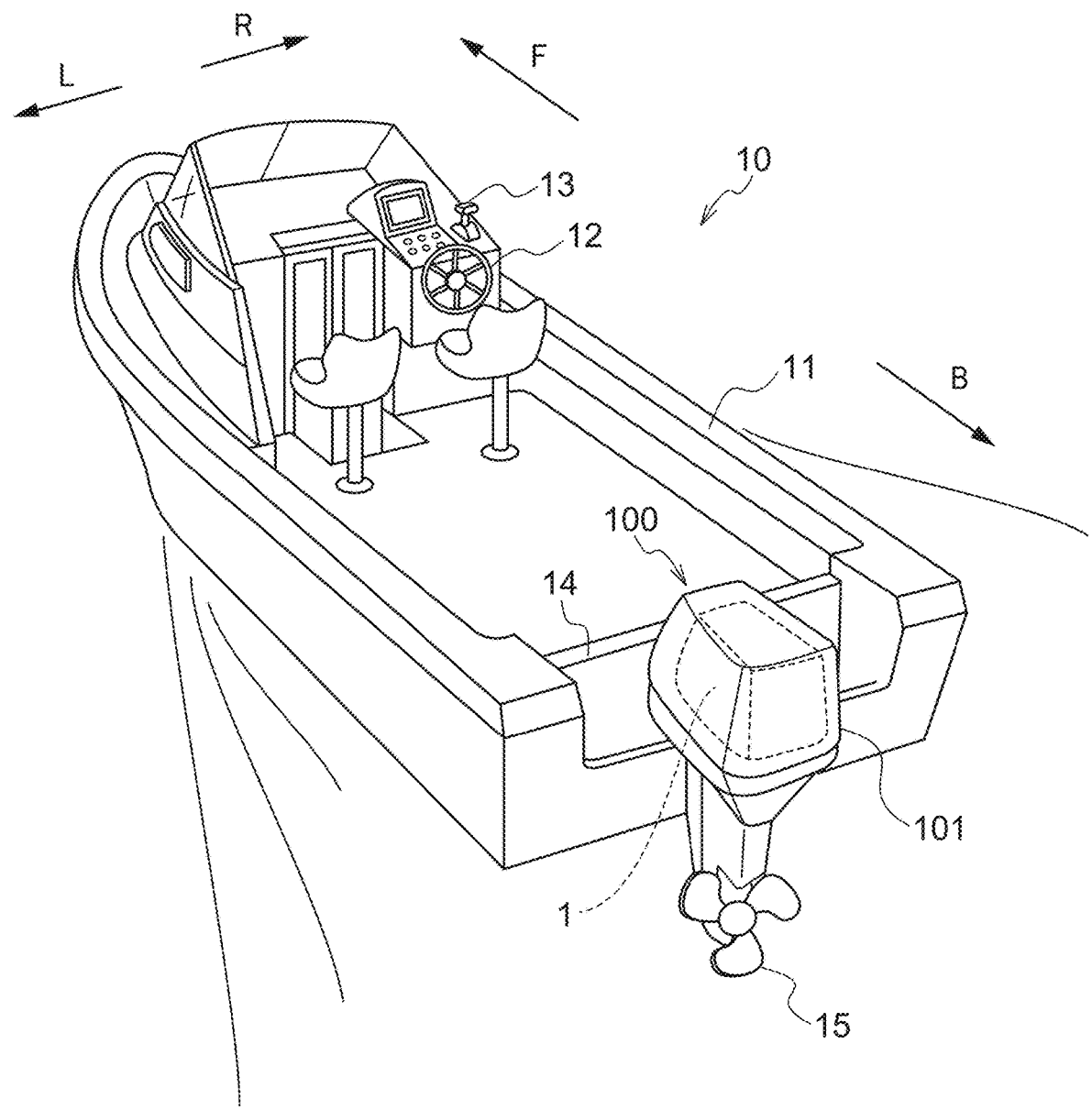
FIG. 1 is a perspective view of a marine vessel which uses a suspension structure for an outboard motor.

FIG. 1 is a perspective view of a marine vessel to which a suspension structure for an outboard motor according to a preferred embodiment of the present invention is provided. The marine vessel 10 includes a hull 11, a steering wheel 12, a remote controller 13, and an outboard motor 100. The outboard motor 100 includes an outboard motor body 101 and a suspension mechanism 200 that supports the outboard motor body 101 to suspend or hang the outboard motor body 101 onto the hull 11, which will be described below with reference to FIG. 2. The outboard motor body 101 is attached to a transom 14 at the rear of the hull 11 via the suspension mechanism 200.

In the following description, unless otherwise specified, front, rear (or back), left, and right respectively mean front, rear (or back), left and right in the reference condition in which a steering axis 41 (FIGS. 4 and 6) extends vertically and the outboard motor 100 is not inclined to the left or right relative to the hull 11. In the reference position, left and right are defined with reference to the view of the marine vessel 10 from the rear. Reference signs F, B, L, and R in the drawings represent front, back, left, and right, respectively. For convenience, it is assumed that, when the steering axis 41 extends vertically, such a position of the outboard motor 100 (outboard motor body 101) belongs to the tilted-down position.

The steering wheel 12 is provided to steer the hull 11. Due to an occupant of the marine vessel 10 operating the steering wheel 12, the outboard motor body 101 rotates leftward or rightward relative to the hull 11. The mode of the outboard motor 100 may change to a forward mode, a backward mode, or a neutral mode according to the operation of the remote controller 13 by the occupant (shift change). The outboard motor body 101 includes an engine 1 and a propulsion system with a propeller 15. The engine 1 is provided with a throttle valve (which is not illustrated). The opening degree of the throttle valve may be adjusted by an occupant operating the remote controller 13. An output of the outboard motor 100 is adjusted according to the adjustment of the opening degree of the throttle valve.

Figure 2:
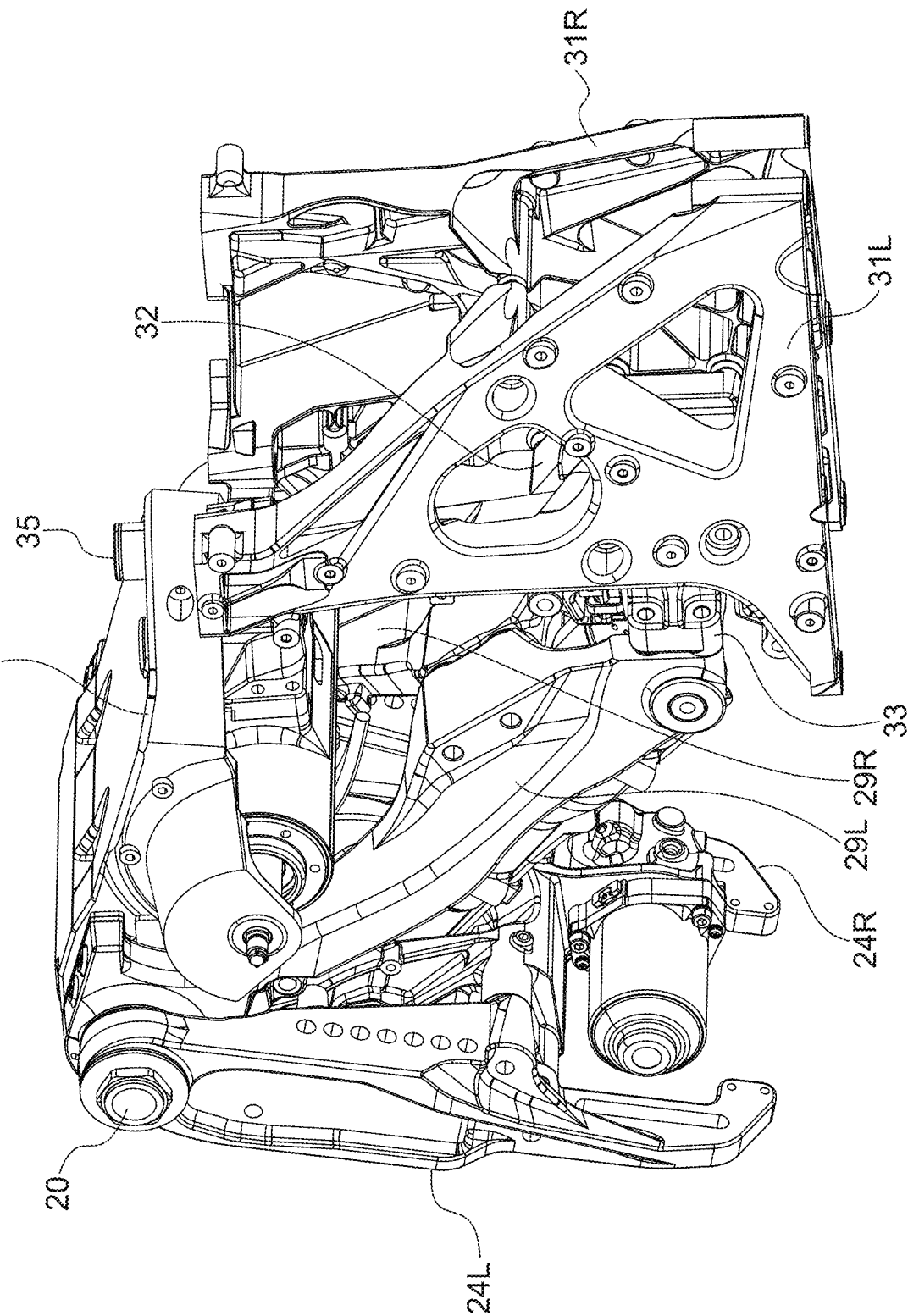
FIG. 2 is a perspective view of a suspension mechanism (in a tilted-down position).
Figure 3:
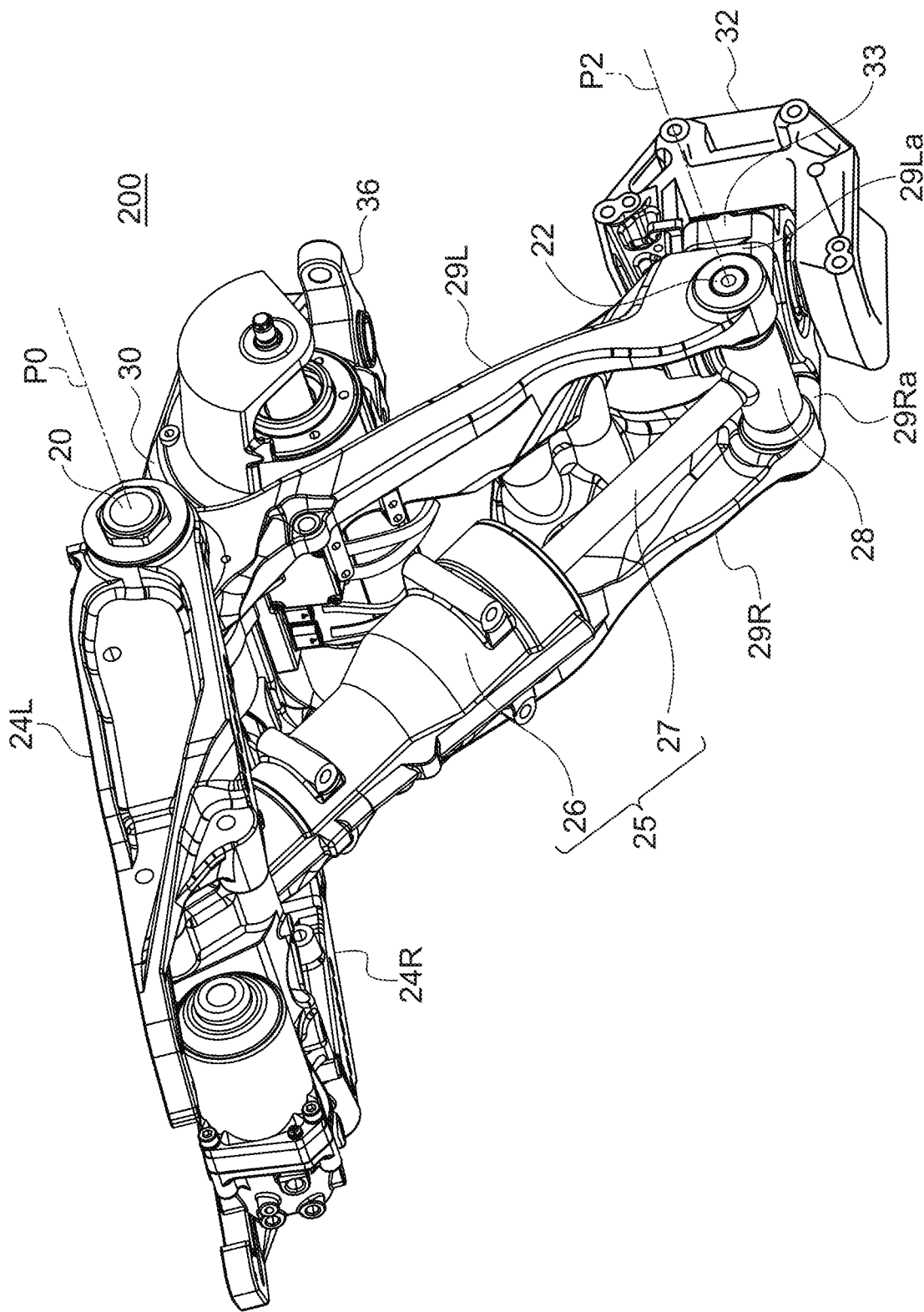
FIG. 3 is a perspective view of the suspension mechanism (in a tilted-up position).
Figure 4:
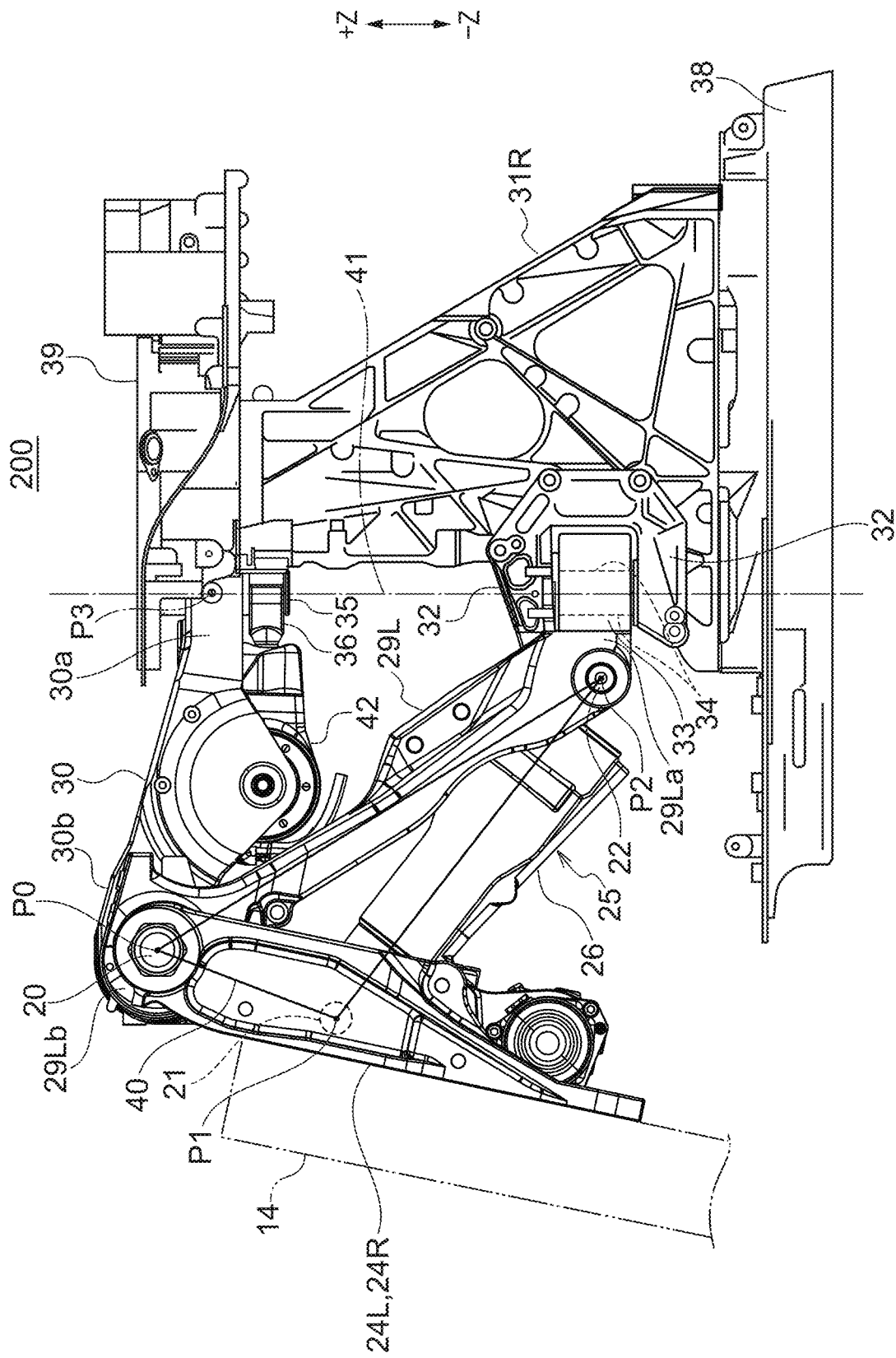
FIG. 4 is a side view of the suspension mechanism as viewed from the left (in the tilted-down position).
Figure 5:
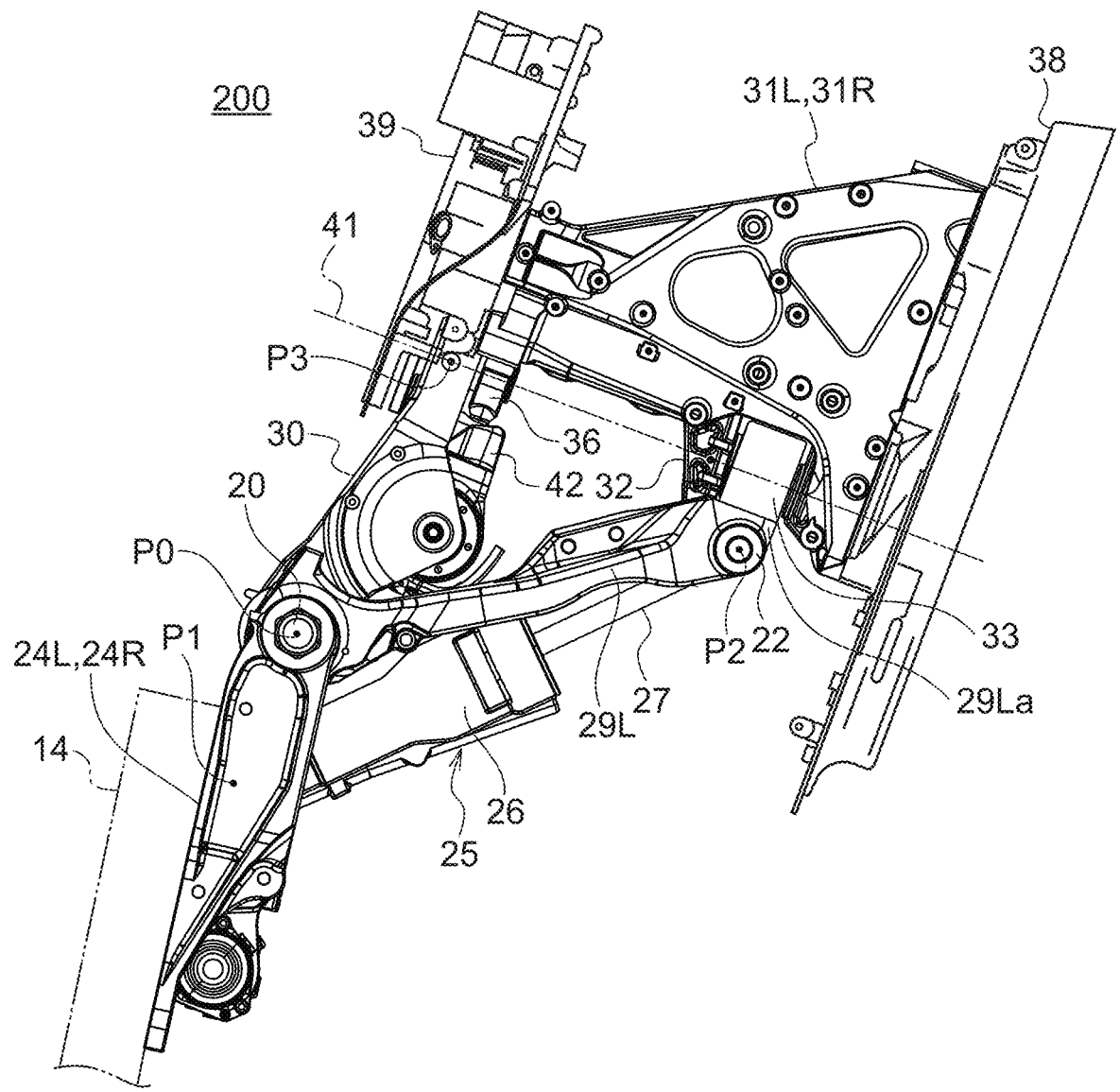
FIG. 5 is a side view of the suspension mechanism as viewed from the left (in the tilted-up position).

FIGS. 2 and 3 are perspective views of the suspension mechanism 200. FIGS. 4 and 5 are side views of the suspension mechanism 200 as viewed from the left. FIGS. 2 and 4 illustrate a case where the outboard motor 100 is in the tilted-down position, and FIGS. 3 and 5 illustrate a case where the outboard motor 100 is in a tilted-up position. Note that FIGS. 4 and 5 also illustrate the lower case 38 and the exhaust guide 39 included in the outboard motor body 101. In FIG. 3, illustration of a pair of frames 31L and 31R is omitted. Furthermore, in FIG. 4, illustration of a left frame 31L is omitted.

As illustrated in FIG. 4, hereinafter, a direction parallel to the steering axis 41 is defined as a Z direction. In particular, when the outboard motor 100 is in the tilted-down position, the +Z direction is upward and the −Z direction is downward.

As illustrated in FIGS. 2 to 5, main components of the suspension mechanism 200 include a swivel bracket 30, a pair of frames 31L and 31R, a pair of clamp brackets 24L and 24R, a pair of side swivel brackets 29L and 29R, and a PTT cylinder 25. The frames 31L and 31R may be interpreted as being included in the outboard motor body 101. The PTT cylinder 25 includes a cylinder body 26 and a rod 27.

As illustrated in FIGS. 2 and 4, a mount holding portion 32 is fixed to the front lower portions of the frames 31L and 31R when the outboard motor body 101 is in the tilted-down position. The mount holding portion 32 is a holder that holds a lower mount 33, and is U-shaped or substantially U-shaped as viewed from a side of the suspension mechanism 200 (in side view). The mount holding portion 32 holds the lower mount 33 from both sides in the steering axis 41 direction (Z direction). The lower mount 33 supports the outboard motor body 101 and mainly bears the weight of the outboard motor body 101, which is preferably only one main load bearing portion in the suspension mechanism 200. When the outboard motor body 101 is in the tilted-down position, the lower mount 33 is at the lowest position among portions that support the outboard motor body 101 except the clamp brackets 24L and 24R. The lower mount 33 holds a lower pivot 34 (FIG. 4).

When the outboard motor body 101 is in the tilted-down position, an upper pivot 35 (held portion) is located at a position higher (in the +Z direction) than the lower mount 33 in the outboard motor body 101. The lower pivot 34 and the upper pivot 35 function as a steering shaft. That is, a drive shaft (which is not illustrated) extends through a hole of the lower pivot 34 and a hole in the upper pivot 35. The steering axis 41 is a common center line of the pivots 34 and 35 and coincides with an axis of the drive shaft. Details of the upper pivot 35 will be described below with reference to FIG. 7.

Figure 6:
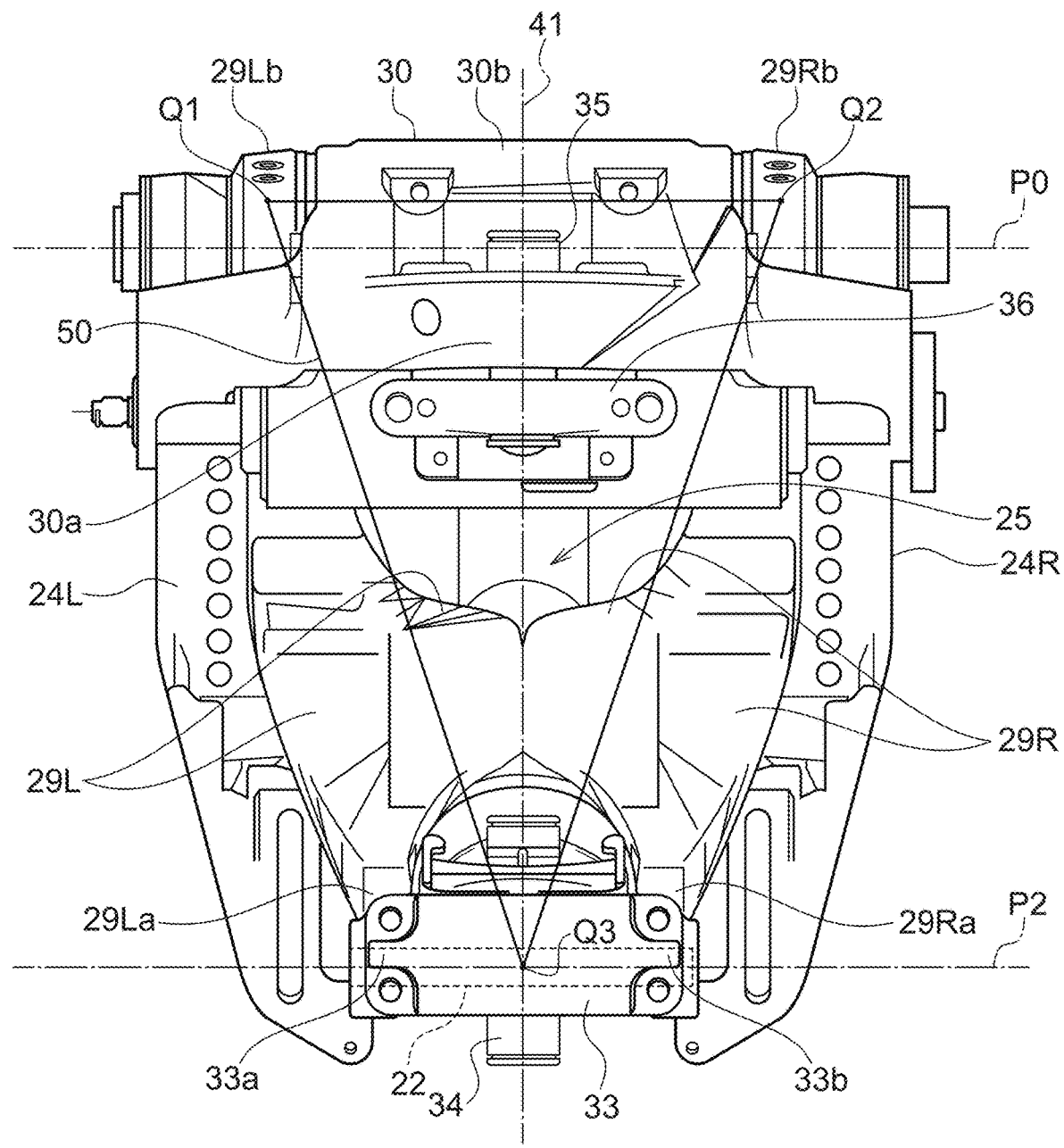
FIG. 6 is a rear view of a main portion of the suspension mechanism (in the tilted-down position).

FIG. 6 is a rear view of a main portion of the suspension mechanism 200. FIG. 6 illustrates a case where the outboard motor 100 is in the tilted-down position. In FIG. 6, the frames 31L and 31R, the lower case 38, and the exhaust guide 39 are omitted.

As illustrated in FIGS. 4 and 5, a pair of clamp brackets 24L and 24R are fixed to the hull 11, specifically, to a rear surface of the transom 14 at the rear portion of the hull 11 by fasteners (which are not illustrated). A tilt shaft 20 is supported by the clamp bracket 24L and the clamp bracket 24R. The tilt shaft 20 extends in the left-right direction and is oriented horizontally or substantially horizontally. A tilt axis P0 is a central axis of the tilt shaft 20. The side swivel brackets 29L and 29R (coupling members) and the swivel bracket 30 (second coupling member) are supported by the tilt shaft 20 so as to be rotatable about the tilt shaft 20, that is, about the tilt axis P0.

As illustrated in FIG. 6, a front end portion 29Lb which is one end of the side swivel bracket 29L is supported by the tilt shaft 20, and a front end portion 29Rb which is one end of the side swivel bracket 29R is supported by the tilt shaft 20. Therefore, the side swivel brackets 29L and 29R are rotatable about the tilt axis P0.

A front end portion 30b which is one end of the swivel bracket 30 is supported by the tilt shaft 20 in a region between the front end portion 29Lb of the side swivel bracket 29L and the front end portion 29Rb of the side swivel bracket 29R. As a result, the swivel bracket 30 is rotatable about the tilt axis P0 in the up-down direction relative to the clamp brackets 24L and 24R. The swivel bracket 30 has a linear shape as viewed from a side of the suspension mechanism 200. Here, the linear shape includes a substantially linear shape, that is, a case where a portion bent to some extent is present in the swivel bracket 30 in addition to a case where the swivel bracket 30 is strictly linear.

In the direction of the tilt axis P0 (left-right direction), the front end portion 29Lb is located at the left end portion of the tilt shaft 20, and the front end portion 29Rb is located at the right end portion of the tilt shaft 20. As a result, the position (first position) of the front end portion 29Lb and the position (second position) of the front end portion 29Rb are separated from each other in the tilt axis P0 direction.

As illustrated in FIGS. 4 and 6, the rear end portion 29La that is the other end of the side swivel bracket 29L and the rear end portion 29Ra that is the other end of the side swivel bracket 29R are both fixed to the lower mount 33 with a plurality of bolts, for example. In particular, referring to the left-right direction, the rear end portion 29La is fixed to a support position 33a which is a left end portion of the lower mount 33, and the rear end portion 29Ra is fixed to a support position 33b which is a right end portion of the lower mount 33 (FIG. 6). That is, the rear end portion 29La and the rear end portion 29Ra are fixed to the outboard motor body 101 via the lower mount 33 and the mount holding portion 32. The rear end portion 29La and the rear end portion 29Ra are pivotally supported by the second rotation shaft 22. A second rotation center P2 is a central axis of the second rotation shaft 22. The second rotation shaft 22 is located in the vicinity of the lower mount 33.

The PTT cylinder 25 changes a trim angle or a tilt angle of the outboard motor body 101. The PTT cylinder 25 extends from the rear end portion 29La and the rear end portion 29Ra to the clamp brackets 24L and 24R. Here, one end of the PTT cylinder 25 is supported by the clamp brackets 24L and 24R so as to be rotatable about the first rotation shaft 21 in the up-down direction relative to the clamp brackets 24L and 24R. The other end of the PTT cylinder 25 supports the side swivel brackets 29L and 29R so as to be rotatable about the second rotation shaft 22 in the up-down direction.

As illustrated in FIG. 3, the rod 27 of the PTT cylinder 25 includes a connecting portion 28. The connecting portion 28 is pivotally supported by the second rotation shaft 22 between the rear end portion 29La and the rear end portion 29Ra arranged in the left-right direction. With this structure, the side swivel brackets 29L and 29R and the PTT cylinder 25 are rotatable about the second rotation center P2 relative to each other. The cylinder body 26 of the PTT cylinder 25 is connected to the clamp brackets 24L and 24R via a housing of the cylinder body 26 so as to be rotatable about the first rotation center P1 (FIGS. 4 and 5) of the first rotation shaft 21. As a result, the clamp brackets 24L and 24R and the cylinder body 26 are rotatable about the first rotation center P1 relative to each other. The first rotation center P1 is located at a position lower than the tilt shaft 20. That is, one end of the PTT cylinder 25 is supported by the clamp brackets 24L and 24R at a position lower than the tilt shaft 20.

Figure 7:
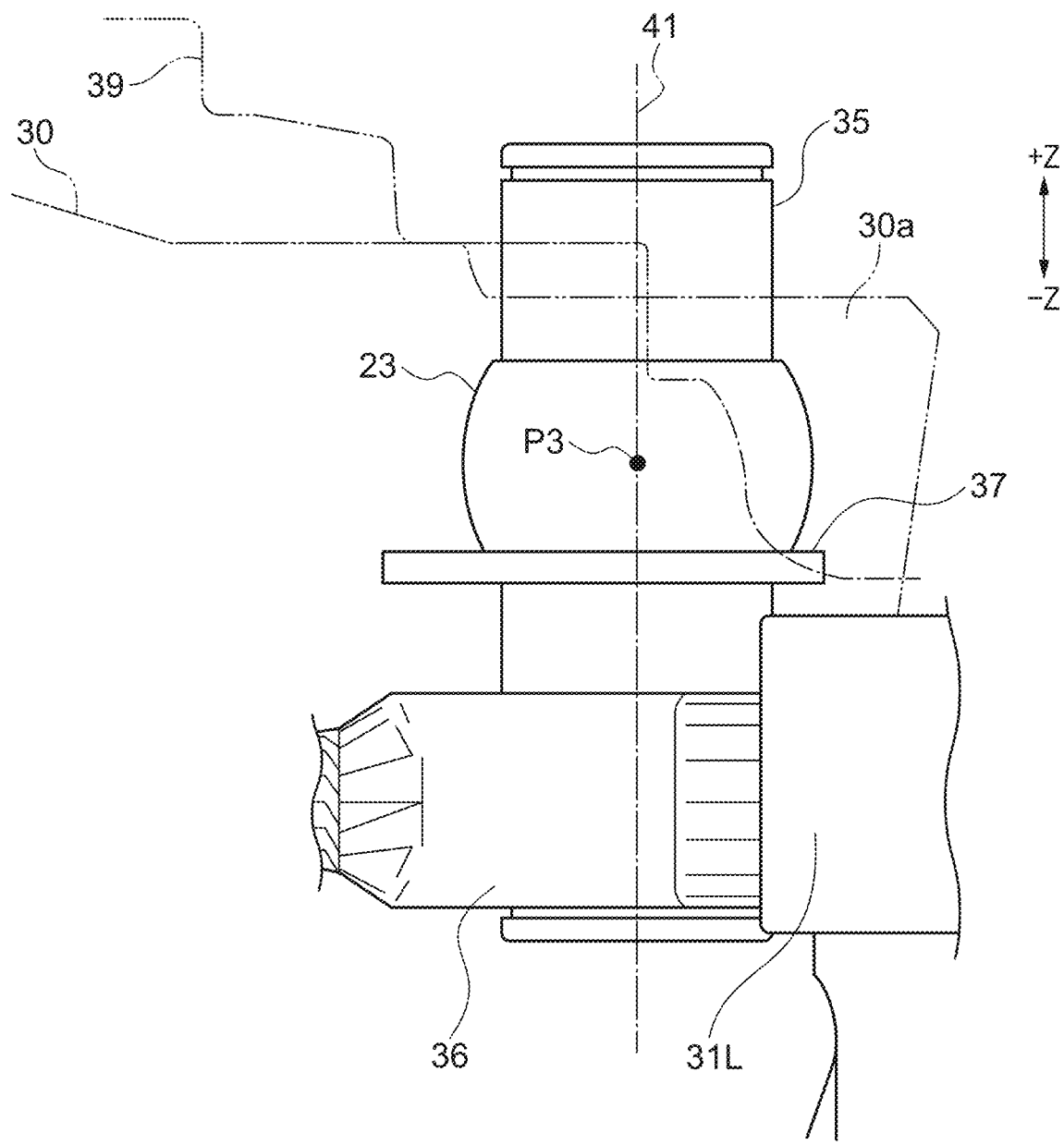
FIG. 7 is an enlarged side view of the periphery of an upper pivot.

FIG. 7 is an enlarged side view of the periphery of the upper pivot 35. A rear end portion 30a (see also FIGS. 4 and 6), which is the other end of the swivel bracket 30, supports the upper pivot 35 so as to be rotatable at least in the up-down direction about a third rotation center P3 (third rotation shaft). The upper pivot 35 is regulated in position in the Z direction by the exhaust guide 39 and a plate 37. The upper pivot 35 includes a spherical portion 23. The rear end portion 30a of the swivel bracket 30 is slidably engaged with the spherical portion 23 via a bush (which is not illustrated). As a result, the rear end portion 30a of the swivel bracket 30 and the spherical portion 23 are relatively rotatable about the steering axis 41, and are rotatable about the third rotation center P3.

A steering bracket 36 is engaged with the upper pivot 35 at a position shifted in the −Z direction from the spherical portion 23, and a driver 42 is connected to the steering bracket 36 (see also FIGS. 4 and 5). The frames 31L and 31R are fixed to the steering bracket 36. The driver 42 rotates the steering bracket 36 about the steering axis 41. As a result, the frames 31L and 31R are rotated about the steering axis 41. By rotating the frames 31L and 31R, the orientation of the outboard motor body 101 is changed in the left-right direction.

The shapes of the side swivel brackets 29L and 29R are linear as viewed from a side of the suspension mechanism 200 (FIGS. 4 and 5). As viewed also from the rear, the shapes of the side swivel brackets 29L and 29R extending from the front end portions 29Lb and 29Rb to the lower mount 33 are also linear (FIG. 6). Here, the linear shape includes a substantially linear shape, that is, a case where a portion bent to some extent is present in each of the side swivel brackets 29L and 29R in addition to a case where each of the side swivel brackets 29L and 29R is strictly linear.

As illustrated in FIG. 4, when the outboard motor body 101 is in the tilted-down position, the third rotation center P3 is located at a position lower than the tilt shaft 20. That is, when the outboard motor body 101 is in the tilted-down position, the swivel bracket 30 is inclined downward toward the rear. Furthermore, when the outboard motor body 101 is in the tilted-down position, the second rotation shaft 22 is located at a position lower than the first rotation shaft 21. That is, when the outboard motor body 101 is in the tilted-down position, the PTT cylinder 25 is inclined downward toward the rear.

As illustrated in FIG. 6, the lower mount 33 is located between the front end portion 29Lb (first position) and the front end portion 29Rb (second position) with respect to the direction (left-right direction) parallel to the tilt axis P0. When the outboard motor body 101 is in the tilted-down position, the lower mount 33 is located at a position lower than the front end portion 29Lb and the front end portion 29Rb. When the outboard motor body 101 is in the tilted-down position, a virtual triangle 50 defined by vertices of the front end portion 29Lb, the front end portion 29Rb, and the lower mount 33 is formed, as viewed from the rear. The center positions of the front end portions 29Lb and 29Rb and the lower mount 33 viewed from the rear define vertices Q1, Q2, and Q3, respectively. The vertices Q1, Q2, and Q3 form the virtual triangle 50.

Meanwhile, as illustrated in FIG. 4, a virtual triangle 40 defined by vertices of the tilt axis P0 of the tilt shaft 20, the first rotation center P1 of the first rotation shaft 21, and the second rotation center P2 of the second rotation shaft 22 is formed, as viewed from a side of the suspension mechanism 200.

Next, a description is provided of the operation of tilting up/down the outboard motor body 101 by the PTT cylinder 25. The rod 27 extends from and retracts into the cylinder body 26 while being driven by a drive source (which is not illustrated). With an extension of the rod 27, the connecting portion 28 (FIG. 3) pushes the second rotation shaft 22. As a result, the side swivel brackets 29L and 29R are subjected to a biasing force via the second rotation shaft 22, and rotate upward (counterclockwise in FIG. 4), which corresponds to a tilt-up direction, about the tilt axis P0. Since the distance between the second rotation center P2 and the third rotation center P3 is constant, the swivel bracket 30 also rotates in the tilt-up direction about the tilt axis P0 in conjunction with the rotation of the side swivel brackets 29L and 29R.

Conversely, with a retraction of the rod 27, which had been extended due to the tilting up process, the side swivel brackets 29L and 29R and the swivel bracket 30 rotate in a tilting down direction about the tilt axis P0. In the tilting up/down process, the triangular shape having the tilt axis P0, the second rotation center P2, and the third rotation center P3 as vertices in the side view is maintained.

During navigation of the marine vessel 10, a lateral load may be applied to the lower portion of the outboard motor body 101. For example, a leftward or rightward water pressure may be applied to the lower portion of the outboard motor body 101 when the hull 11 turns. For another example, a lateral load may be applied to the lower portion of the outboard motor body 101 when the hull 11 leaves the water surface and then lands on the water in a situation where swells are large. Further, a forward thrust force originated from the thrust is applied to the suspension mechanism 200. Conventionally, a large bending stress may occur in the constituent members of the suspension mechanism due to the thrust force, the lateral load, and/or the weight of the outboard motor body. On the other hand, when the strength of the constituent members of the suspension mechanism simply increases, it increases the total weight of the suspension mechanism. To solve this issue, the suspension mechanism 200 in the present preferred embodiment is devised so that the bending stress occurring therein is reduced.

As described above, the side swivel brackets 29L and 29R are substantially linear. As illustrated in FIG. 6, the lower mount 33 is located between the front end portion 29Lb (first position) and the front end portion 29Rb (second position) with respect to the direction parallel to the tilt axis P0 (that is, the lower mount 33 is located between the front end portion 29Lb and the front end portion 29Rb when the lower mount 33, the front end portion 29Lb, and the front end portion 29Rb are projected on a straight line parallel to the tilt axis P0). When the outboard motor body 101 is in the tilted-down position, the lower mount 33 is located at a position lower than the front end portion 29Lb and the front end portion 29Rb, and the virtual triangle 50 is formed by the vertices Q1, Q2, and Q3 as viewed from the rear.

As a result, when a thrust force is applied to the lower mount 33 from the right side, it causes a compressive force acting between the front end portion 29Lb and the lower mount 33 on the side swivel bracket 29L, and a tensile force acting between the front end portion 29Rb and the lower mount 33 on the side swivel bracket 29R. When a thrust force is applied to the lower mount 33 from the left side, an action opposite to this occurs. That is, in response to the thrust force applied to the lower mount 33 in the left-right direction, a compressive force acts on one of the side swivel brackets 29L and 29R, and a tensile force acts on the other. Bending stress hardly occurs in the side swivel brackets 29L and 29R. Therefore, it is less necessary to increase the member strength of the side swivel brackets 29L and 29R in order to cope with the bending stress. As a result, it is possible to increase the strength of the weight of the suspension mechanism 200 while significantly reducing or preventing an increase in its weight.

As illustrated in FIG. 4, the second rotation shaft 22 connecting the rear end portion of the PTT cylinder 25 and the side swivel brackets 29L and 29R is located in the vicinity of the lower mount 33. As viewed from a side of the suspension mechanism 200, the virtual triangle 40 defined by vertices of the tilt axis P0, the first rotation center P1, and the second rotation center P2 is formed. Accordingly, at least when the outboard motor body 101 is in the tilted-down position, the weight of the outboard motor body 101 or the forward thrust force causes a tensile force acting between the tilt shaft 20 and the second rotation shaft 22 on the side swivel brackets 29L and 29R, and a compressive force acting between the first rotation shaft 21 and the second rotation shaft 22 on the PTT cylinder 25. This reduces the bending stress that occurs in the side swivel brackets 29L and 29R originating from the weight of the outboard motor body 101 or the forward thrust force. Therefore, it is less necessary to increase the member strength of the side swivel brackets 29L and 29R in order to cope with the bending stress. Accordingly, it is possible to increase the strength of the suspension mechanism 200 while significantly reducing or preventing an increase in its weight.

Moreover, the upper pivot 35 is located at a position higher than the lower mount 33 when the outboard motor body 101 is in the tilted-down position. The front end portion 30b of the swivel bracket 30 is rotatably supported by the tilt shaft 20, and the rear end portion 30a rotatably supports the upper pivot 35 about the third rotation center P3. As a result, the lower mount 33 which is the main load bearing portion bears most of the weight of the outboard motor body 101 and the forward thrust force.

Here, in a state where the weight of the outboard motor body 101 and the forward thrust force act, a force due to a rotational moment in the clockwise direction in FIG. 4 around the second rotation center P2 acts on the upper pivot 35, but a load in the vertical direction and the forward direction hardly act on the upper pivot 35. As a result, the lower mount 33 bears most of the weight of the outboard motor body 101 and the forward thrust force. This enhances the effect of reducing the bending stress that occurs in the side swivel brackets 29L and 29R. In addition, a tensile force is mainly generated in the swivel bracket 30 against the rotational moment about the second rotation center P2. This reduces the bending stress from occurring in the swivel bracket 30, and it is also possible to reduce the weight of the swivel bracket 30 and improve its strength.

According to the present preferred embodiment, the lower mount 33 is located at the lowest position among portions supporting the outboard motor body 101 except the clamp brackets 24L and 24R, when the outboard motor body 101 is in the tilted-down position. The side swivel brackets 29L and 29R are rotatably supported by the tilt shaft 20 at the front end portion 29Lb (first position) and the front end portion 29Rb (second position), and are fixed to the lower mount 33 at the rear end portion 29La and the rear end portion 29Ra. The lower mount 33 is located between the front end portion 29Lb (first position) and the front end portion 29Rb (second position) with respect to the direction parallel to the tilt axis P0. When the outboard motor body 101 is in the tilted-down position, the lower mount 33 is located at a position lower than the front end portion 29Lb (first position) and the front end portion 29Rb (second position). As viewed from the rear, the virtual triangle 50 defined by vertices of the front end portion 29Lb, the front end portion 29Rb, and the lower mount 33 is formed (FIG. 6). Since this reduces the bending stress that occurs in the side swivel brackets 29L and 29R due to the lateral load, the strength of the suspension mechanism 200 is increased while significantly reducing or preventing an increase in its weight.

The side swivel brackets 29L and 29R are linear, and the front end portion 29Lb and the front end portion 29Rb are separated from each other in the direction of the tilt axis P0. In such a structure, the bending stress is less likely to occur in the side swivel brackets 29L and 29R, and the lower mount 33 bears most of the weight of the outboard motor body 101 and the forward thrust force. This enhances the effect of reducing the bending stress from occurring in the side swivel brackets 29L and 29R and contributes to increasing the strength of the suspension mechanism 200.

According to the present preferred embodiment, one end of the PTT cylinder 25, specifically the housing of the cylinder body 26 of the PTT cylinder 25, is supported by the clamp brackets 24L and 24R at a position lower than the tilt shaft 20 so as to be rotatable about the first rotation shaft 21 (first rotation center P1) in the up-down direction relative to the clamp brackets 24L and 24R. Further, the other end of the PTT cylinder 25, specifically the connecting portion 28 of the rod 27 of the PTT cylinder 25, supports the side swivel brackets 29L and 29R so as to be rotatable in the up-down direction about the second rotation shaft 22 (the second rotation center P2). Further, the second rotation shaft 22 is located near the lower mount 33. With such an arrangement, the virtual triangle 40 defined by vertices of the tilt axis P0, the first rotation center P1, and the second rotation center P2 is formed, as viewed from a side of the suspension mechanism 200 (FIG. 4). Since the bending stress that occurs in the side swivel brackets 29L and 29R due to the weight of the outboard motor body 101 and the forward thrust force is reduced, the strength of the suspension mechanism 200 is increased while significantly reducing or preventing an increase in its weight.

From the viewpoint of obtaining this effect, the distance between the lower mount 33 and the second rotation shaft 22 in a side view is preferably shorter than a distance between the lower mount 33 and the tilt shaft 20 in the side view. Alternatively, from the viewpoint of obtaining this effect, the second rotation shaft 22 is preferably provided in the lower mount 33. That is, the second rotation shaft 22 (or the second rotation center P2) may overlap the lower mount 33 in the side view.

Further, the lower mount 33 bears most of the weight of the outboard motor body 101 and the forward thrust force, and thus enhances the effect of reducing the bending stress from occurring in the side swivel brackets 29L and 29R and contributes to increasing the strength of the suspension mechanism 200.

When the outboard motor body 101 is in the tilted-down position, the third rotation center P3 is located at a position lower than the tilt shaft 20, and the swivel bracket 30 is inclined downward toward the rear side (FIG. 4). As a result, it is possible to prevent upward tensile stress from being generated in the clamp brackets 24L and 24R in the vicinity of the tilt shaft 20 when the outboard motor body 101 is in the tilted-down position. This strengthens the attachment of the clamp brackets 24L and 24R to the transom 14.

Moreover, when the outboard motor body 101 is in the tilted-down position, the position of the second rotation shaft 22 is lower than the position of the first rotation shaft 21, and the PTT cylinder 25 is inclined downward toward the rear side (FIG. 4). In such a structure, when the outboard motor body 101 is in the tilted-down position, upward stress occurs in the clamp brackets 24L and 24R at the position of the first rotation shaft 21. Therefore, this and the fact that the swivel bracket 30 is inclined downward toward the rear side make it possible to optimize the stress distribution applied to the clamp brackets 24L and 24R when the outboard motor body 101 is in the tilted-down position. As a result, it is possible to increase the strength of the clamp brackets 24L and 24R while significantly reducing or preventing an increase of their weight.

The mount holding portion 32 is U-shaped or substantially U-shaped as viewed from a side of the suspension mechanism 200, and holds the lower mount 33 from both sides in the direction of the steering axis 41 (FIG. 4). As a result, even when the mount holding portion 32 rotates about the steering axis 41 at the time of steering, it is possible to firmly hold the lower mount 33 while avoiding interference with the lower mount 33.

The shapes of the side swivel brackets 29L and 29R are not limited to the illustrated shapes, and may be, for example, shapes closer to a linear shape.

The side swivel bracket is separated into two portions of the side swivel bracket 29L as the first member and the side swivel bracket 29R as the second member. However, these may be integral as one side swivel bracket. In this case, one side swivel bracket may have a substantially V-shape as viewed from the rear.

The marine vessel to which the suspension mechanism 200 according to a preferred embodiment of the present invention is provided may be any marine vessel to which an outboard motor can be attached, and the type is not limited.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A suspension structure for an outboard motor, the suspension structure comprising:
   a clamp bracket attachable to a hull;
   a main load bearing portion to support an outboard motor body and mainly bear a weight of the outboard motor body;
   a tilt shaft;
   a coupling including a first end supported by the tilt shaft and rotatable about the tilt shaft, and a second end fixed to the main load bearing portion; and
   a cylinder to change a trim angle or a tilt angle of the outboard motor body, the cylinder including a first end supported by the clamp bracket at a position lower than the tilt shaft and rotatable about a first rotation shaft in an up-down direction relative to the clamp bracket, and a second end supporting the coupling and rotatable about a second rotation shaft in the up-down direction;
   a held portion located at a position higher than the main load bearing portion in the outboard motor body when the outboard motor body is in a tilted-down position; and
   a second coupling including a first end supported by the tilt shaft and rotatable about the tilt shaft, and a second end supporting the held portion and rotatable about a third rotation shaft at least in the up-down direction; wherein
   the second rotation shaft is provided in or near the main load bearing portion.

2. The suspension structure according to claim 1, wherein a distance between the main load bearing portion and the second rotation shaft as viewed from a side of the suspension structure is shorter than a distance between the main load bearing portion and the tilt shaft as viewed from the side of the suspension structure.

3. The suspension structure according to claim 1, wherein the third rotation shaft is located at a position lower than the tilt shaft when the outboard motor body is in the tilted-down position.

4. The suspension structure according to claim 1, wherein the second rotation shaft is located at a position lower than the first rotation shaft when the outboard motor body is in the tilted-down position.

5. The suspension structure according to claim 1, wherein the tilt shaft, the first rotation shaft, and the second rotation shaft define vertices of a virtual triangle, as viewed from a side of the suspension structure.

6. The suspension structure according to claim 1, wherein when the outboard motor body is in the tilted-down position, the weight of the outboard motor body causes a tensile force acting between the tilt shaft and the second rotation shaft on the coupling, and a compressive force acting between the first rotation shaft and the second rotation shaft on the cylinder.

7. The suspension structure according to claim 1, further comprising:
   a holding portion to hold the main load bearing portion; wherein
   the holding portion is U-shaped or substantially U-shaped as viewed from a side of the suspension structure, and holds the main load bearing portion in a steering axis direction.

8. The suspension structure according to claim 1, wherein
   the coupling is supported by the tilt shaft at a first position and a second position along an axial direction of the tilt shaft while being rotatable about the tilt shaft;
   the main load bearing portion is located between the first position and the second position with respect to a direction parallel to the axial direction of the tilt shaft; and
   when the outboard motor body is in the tilted-down position, the main load bearing portion is located at a position lower than the first position and the second position, and the first position, the second position, and the main load bearing portion define vertices of a virtual triangle, as viewed from a rear of the suspension structure.

9. The suspension structure according to claim 1, wherein a pair of the couplings are arranged in a right-left direction in the suspension structure.

10. The suspension structure according to claim 1, wherein the coupling has a linear shape or a substantially linear shape as viewed from a side of the suspension structure.

11. The suspension structure according to claim 1, wherein the second coupling has a linear shape or a substantially linear shape as viewed from a side of the suspension structure.

12. An outboard motor comprising:
   an outboard motor body; and
   a suspension structure including:
      a clamp bracket attachable to a hull;
      a main load bearing portion to support the outboard motor body and mainly bear a weight of the outboard motor body;
      a tilt shaft;
      a coupling including a first end supported by the tilt shaft and rotatable about the tilt shaft, and a second end fixed to the main load bearing portion; and
      a cylinder to change a trim angle or a tilt angle of the outboard motor body, the cylinder including a first end supported by the clamp bracket at a position lower than the tilt shaft and rotatable about a first rotation shaft in an up-down direction relative to the clamp bracket, and a second end supporting the coupling and rotatable about a second rotation shaft in the up-down direction;
      a held portion located at a position higher than the main load bearing portion in the outboard motor body when the outboard motor body is in a tilted-down position; and
      a second coupling including a first end supported by the tilt shaft and rotatable about the tilt shaft, and a second end supporting the held portion and rotatable about a third rotation shaft at least in the up-down direction; wherein
   the second rotation shaft is provided in or near the main load bearing portion.

* * * * *